Feb. 6, 1923.

F. M. COE

TRACTOR HITCH

Filed June 20, 1922

1,444,456

Frank M. Coe
Inventor

By his Attorneys
Dodson and Rex

Patented Feb. 6, 1923.

1,444,456

UNITED STATES PATENT OFFICE.

FRANK M. COE, OF NEW YORK, N. Y.

TRACTOR HITCH.

Application filed June 20, 1922. Serial No. 569,686.

*To all whom it may concern:*

Be it known that I, FRANK M. COE, a citizen of the United States, and residing at New York city, in the county of New York and State of New York, have invented a certain new and useful Improvement in Tractor Hitch, of which the following is a specification.

The object of my invention is to provide hitching means for plows, and the like, to tractors, and which will cause the pull of the tractor to exert a downward pressure on the plows so as to force them into the ground, rather than to pull them forwardly and partially upward from the ground.

A further object is to so construct the hitch that it will exert a strong downward pressure on the rear portion of the tractor itself so that it will assist in forcing the drive wheels hard against, or into, the ground thus minimizing the tendency of the wheels to slip and spin when the character of the ground or the weight of the load, or both, is excessive.

A further object is to so connect my hitching means that it will exert a downward pull on the whole tractor, even extending to the forward wheels thereof and will keep them firmly in contact with the ground, thereby preventing accidents, which many times causes tractors to tip over.

My invention accomplishes all of these objects, as well as other objects as will be readily ascertained by my description.

My invention consists of certain details of construction hereinafter set forth, pointed out in my claims, and illustrated in the accompanying drawing, in which Fig. 1 is a diagrammatic view of the rear axle housing of a tractor showing my improved hitch mounted thereon.

Figure 1:
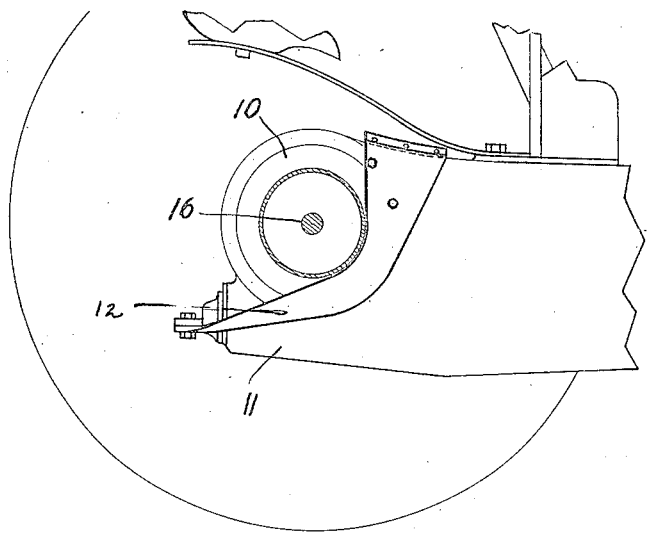
Figure 2:
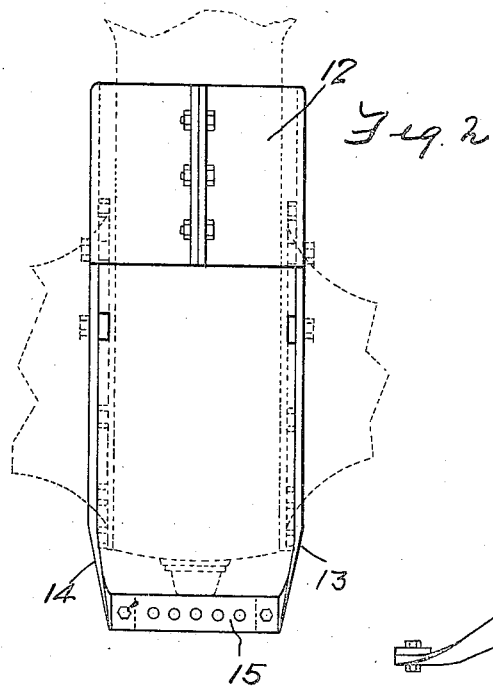
Fig. 2 is a top view of the hitch.
Figure 3:
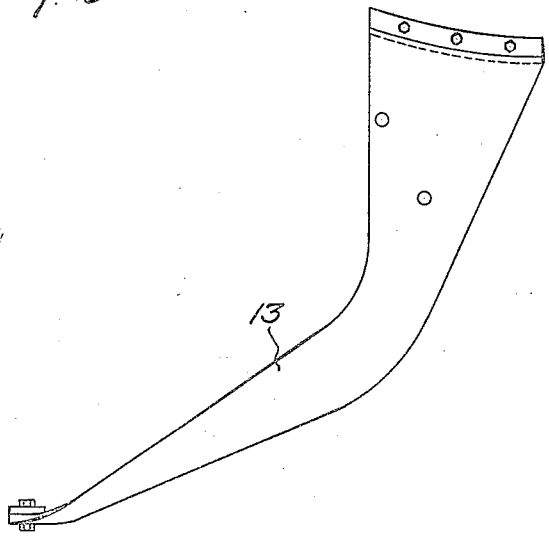
Fig. 3 is a side view of the hitch shown in Fig. 1.

Referring to the accompanying drawings, the reference numeral 10 is used to indicate the housing for the axles and gears of a tractor and the numeral 11 the housing projecting forwardly from the housing 10 and encasing the drive shaft. The numeral 12 indicates a saddle seated on these housings, as shown, and provided with a depending and rearwardly extending arm, on each side thereof as indicated by the numerals 13 and 14 respectively. These arms are similar and designed as companions to receive and support an orificed cross bar 15 secured thereto in any ordinary manner but preferably by bolts as shown. The orifices are for the purpose of receiving the pull cable (not shown) or any coupling for the purpose of attaching the load to the tractor.

The saddle 12 is secured to the housings at points above the horizontal from the rear axle 16, or it may simply be seated on the housing without being fastened if desired. Again this saddle may be entirely dispensed with, if desired, and the pull cable passed forwardly from the load under the housing 10 thence upwardly along one side of the housing 11, over the housing 11, downwardly on the other side of the housing 11, and rearwardly under the housing 10 to a connection with itself or the load.

My construction as shown is simply the preferred construction and may be altered in any way which will cause the pressure from the pull on the load to be exerted on the upper portion of the housings (above a horizontal to the axle) without changing my invention, and I want it understood I do not wish to be limited except as set forth in the appended claims.

Many tests of this hitch have been made and devices of this character have been made and sold by me, and in every instance it has demonstrated it will fully function to attain the objects sought, as outlined in the opening paragraphs of my application.

Having thus described my invention what I claim and desire to secure by Letters Patent of the United States, is:

1. A hitch for tractor loads comprising a saddle seated loosely on the housing of the drive shaft of the tractor with arms extending downwardly on each side of the drive shaft housing and rearwardly under the axle housing, with means to secure the load to said arms.

2. A hitch for tractor loads comprising a saddle loosely seated on the tractor in advance of and above the plane of the axle housing, with arms extending downwardly and rearwardly under the axle housing to connections with the load.

3. A hitch for tractor loads comprising means extending from the load forwardly under the axle of the tractor and upwardly to a free connection above the horizontal plane of the tractor axle.

In testimony whereof, I have signed the foregoing specification.

FRANK M. COE.